US007407064B2

(12) United States Patent
Chirnomas

(10) Patent No.: US 7,407,064 B2
(45) Date of Patent: Aug. 5, 2008

(54) FLOOR GRIPPING PREVENTION DEVICE FOR A VENDING MACHINE

(76) Inventor: Munroe Chirnomas, 47 Skyline Dr., Morristown, NJ (US) 07960

( * ) Notice: Subject to any disclaimer, the term of this patent is extended or adjusted under 35 U.S.C. 154(b) by 0 days.

(21) Appl. No.: 11/156,342

(22) Filed: Jun. 17, 2005

(65) Prior Publication Data

US 2005/0279759 A1 Dec. 22, 2005

Related U.S. Application Data

(60) Provisional application No. 60/580,440, filed on Jun. 17, 2004.

(51) Int. Cl.
*B65G 59/00* (2006.01)

(52) U.S. Cl. ....................... 221/278; 221/208; 221/210; 221/211

(58) Field of Classification Search ................. 221/123, 221/208, 210, 211, 278; 414/454, 793, 797
See application file for complete search history.

(56) References Cited

U.S. PATENT DOCUMENTS 3,300,207 A * 1/1967 Childs et al. .................. 271/98
3,361,295 A * 1/1968 Marchant .................... 221/122
4,045,878 A * 9/1977 Steffen ........................ 34/491
4,542,894 A * 9/1985 Feldkamper et al. .......... 271/11
4,561,687 A * 12/1985 Bostrom .................... 294/64.1
5,240,139 A * 8/1993 Chirnomas ..................... 221/2
5,405,048 A * 4/1995 Rogers et al. ............... 221/211
5,480,062 A * 1/1996 Rogers et al. ............... 221/174
5,688,008 A * 11/1997 Hansch ...................... 294/64.1
5,855,374 A * 1/1999 Shoemaker, Jr. ............ 273/447
5,971,205 A * 10/1999 Michaels et al. ............ 221/135
6,547,096 B1 * 4/2003 Chirnomas .................. 221/123
6,641,131 B2 * 11/2003 Stohr et al. .................... 271/91
6,745,694 B1 * 6/2004 Ellis et al. ................... 101/477
6,770,001 B1 * 8/2004 Shoemaker, Jr. ............ 473/447
7,044,330 B2 * 5/2006 Chirnomas .................. 221/123
7,044,332 B2 * 5/2006 Giegerich et al. ........... 221/278
2003/0047569 A1 * 3/2003 Chrinomas .................. 221/210
2003/0080138 A1 * 5/2003 Chrinmoas .................. 221/123
2003/0094463 A1 * 5/2003 Chrinomas .................. 221/123
2005/0039688 A1 * 2/2005 Correa et al. ................ 119/6.8

* cited by examiner

*Primary Examiner*—Gene O. Crawford
*Assistant Examiner*—Michael K Collins
(74) *Attorney, Agent, or Firm*—Lawrence C. Edelman, Esq.

(57) ABSTRACT

An article storage container for use in an article handler which uses a suction-type gripping device. The container comprises a bin having wall portions and a bottom portion, for storing in a columnar manner, articles to be retrieved by the gripping device. The gripping device enters a dispensing end of the bin which is opposite the bottom portion of the bin. An airflow path providing device at the bottom portion of the bin prevents the gripping device from developing enough suction force to grip to the bottom of the bin.

40 Claims, 3 Drawing Sheets

FLOOR GRIPPING PREVENTION DEVICE FOR A VENDING MACHINE

CROSS-REFERENCE TO RELATED APPLICATIONS

This application claims priority under 35USC 120 of U.S. Provisional Patent Application No 60/580,440, filed Jun. 17, 2004, entitled "Anti-Suction Device For Bin Floor In A Suction Vending Machine". The entire disclosure of this patent application is incorporated herein by reference in its entirety.

BACKGROUND OF THE INVENTION

1. Field of the Invention

The present invention relates to techniques for reducing/preventing the tendency of the pick-up head in a suction-type article dispensing machine from adhering to the bottom of an article storage bin in the event that the pick-up head tries to retrieve another article after the last article has already been dispensed.

2. Background Information and Description of the Related Art

My earlier published prior U.S. Pat. No. 5,240,139 and one of my more recent patent publications, such as WO 01/95276 A3 (entitled Method And Apparatus For Positioning An Article Handling Device, or US Patent Publication 2003/0063969 having the same title, disclose automatic vending machines which use a robotically controlled vacuum (sometimes referred to as suction) hose, in order to retrieve and dispense the articles stored in stacks in aligned bins.

With such an article dispensing arrangement, it is possible that in the event of a malfunction, the article pick-up head at the end of the vacuum hose may actually contact and then adhere to the bottom of an article storing bin. It would be desirable to provide modifications to the bottom of an article storage bin so as to reduce/prevent the pick-up head in a suction-type article dispensing machine from adhering to the bottom of the bin after the last article has been dispensed.

SUMMARY OF THE INVENTION

In accordance with one aspect of a preferred embodiment of the present invention, to prevent/reduce the tendency of the pick-up head in a suction-type article dispensing machine from adhering to the bottom of an article storage bin in the event the pick-up head inadvertently tries to retrieve another article after the last article has already been dispensed from the bin, an airflow path providing device is positioned or formed at the bottom of the article storage bin, which device prevents the article pick-up head from developing enough suction to grip/adhere to the bottom of the bin.

BRIEF DESCRIPTION OF THE DRAWINGS

The accompanying drawings, which are incorporated herein and constitute part of this specification, illustrate embodiments and details of the invention, and, together with the general description given above and the detailed description given below, serve to explain the features of the invention.

DETAILED DESCRIPTION OF THE INVENTION

Figure 1:
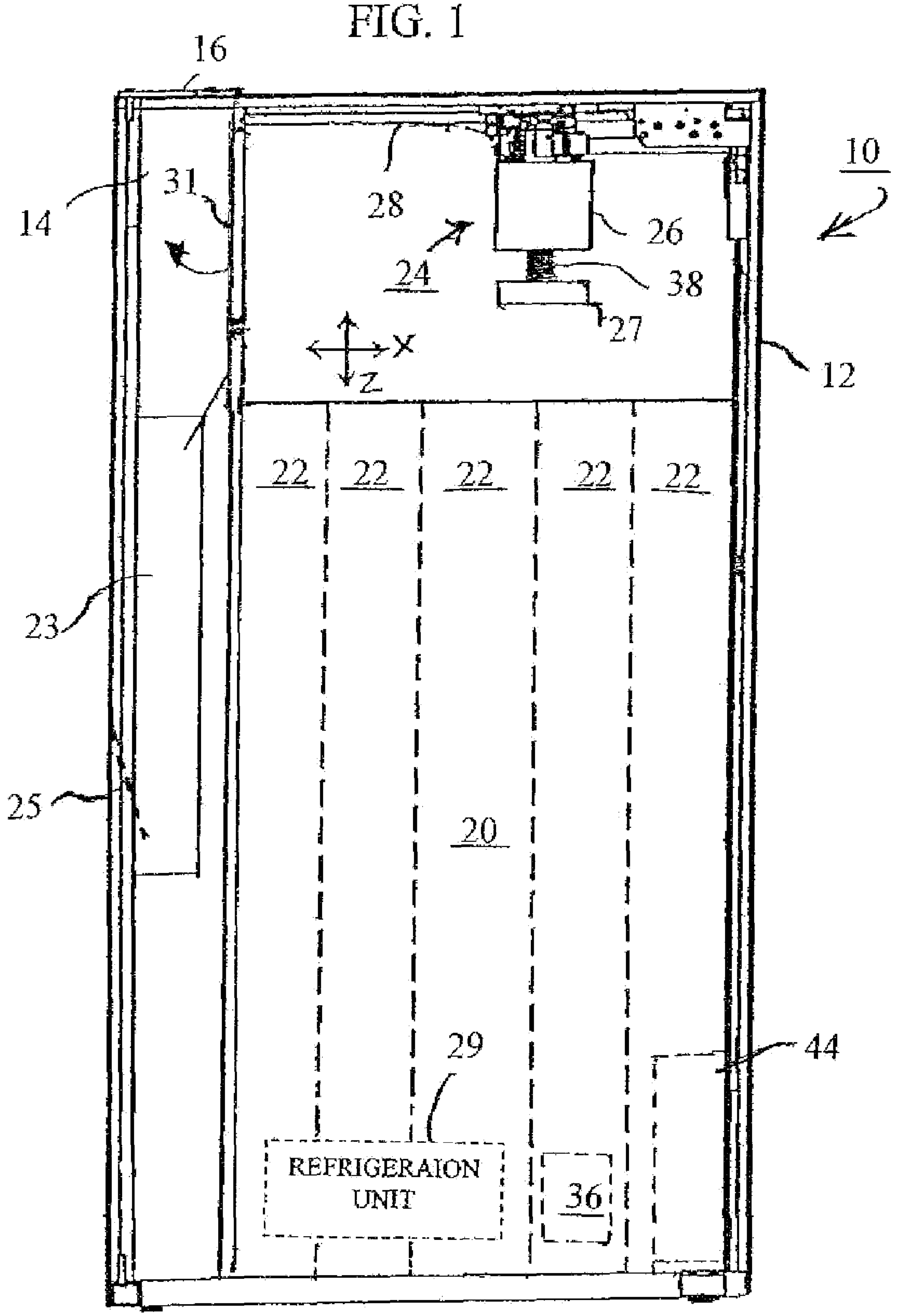
FIGS. 1 and 2 illustrate a side section view and a perspective cut away view, respectively, of a vending machine constructed and operating in accordance with the principles of the present invention.
Figure 2:
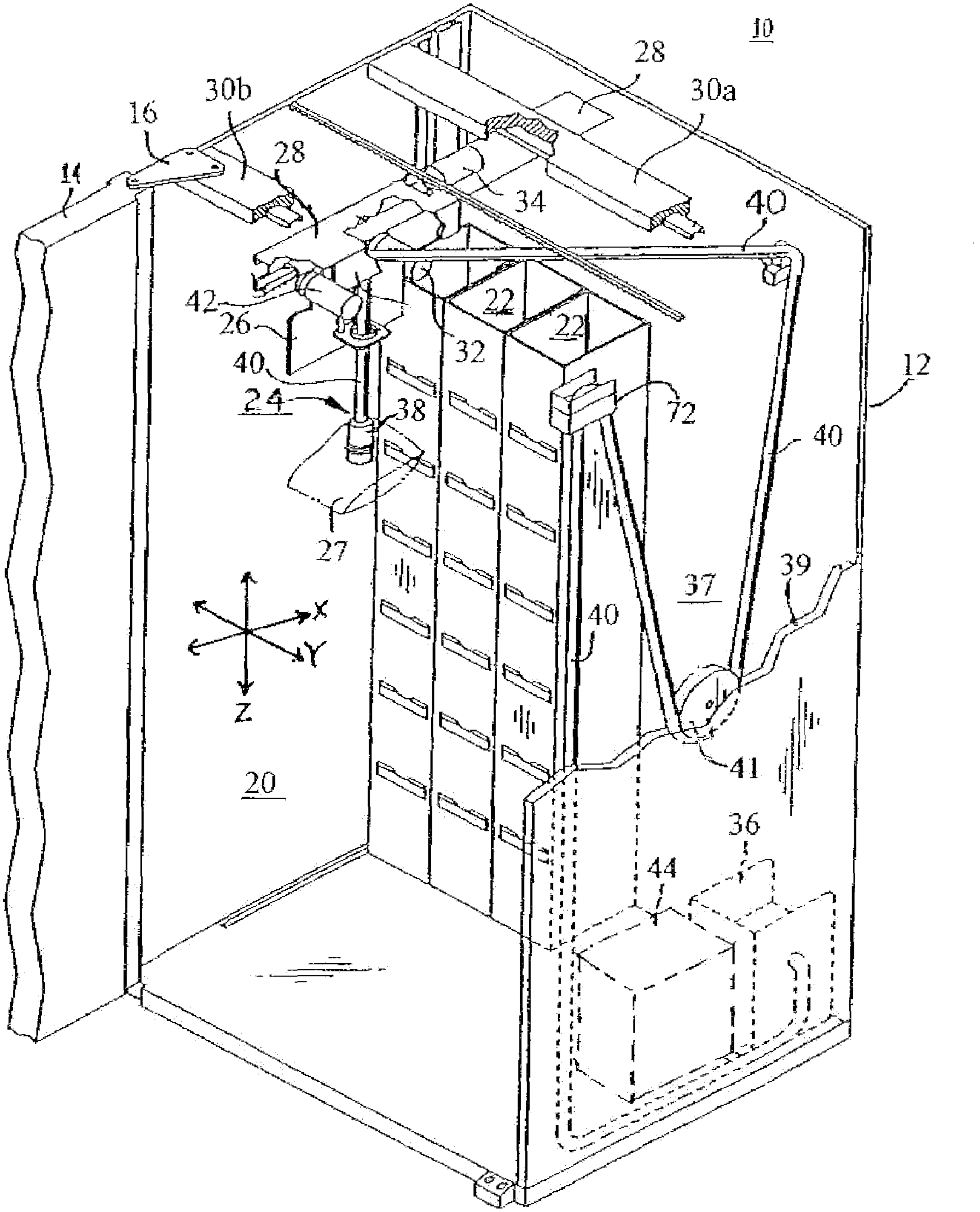

As shown in FIGS. 1 and 2, vending machine 10 typically includes a housing 12, typically comprised of sheet metal which forms three side walls of housing 12, as well as a top and a bottom portion therefore. A front door 14 is typically constructed of similar material, which is mounted to the open fourth side of the housing 12 via hinges 16. Details of conventional portions vending machine 10, such as the user article selection mechanism (typically comprising article graphics and selection buttons or a keypad), and a user payment system (typically comprising a coin mechanism and bill validator), which portions are typically mounted wholly or partially on door 14, are not necessary for understanding the invention, and therefore no further description will be provided herein.

The interior of housing 12 includes a storage area 20, which in the illustrated embodiment comprises a plurality of a vertically aligned article storage bins 22 for storing vertical stacks of the articles to be dispensed by vending machine 10. The upper portion of the interior of housing 12 includes an electronically controlled (i.e., robotic) article retrieving device (ARD) 24. ARD 24 can be constructed as is known and shown in my prior U.S. Pat. No. 5,240,139, or as taught by one of my more recent PCT patent publications, such as WO 01/95276 A3 (entitled METHOD AND APPARATUS FOR POSITIONING AN ARTICLE HANDLING DEVICE, or U.S. Ser. No. 10/205,770 (now US Patent Publication 2003/0063969), incorporated herein by reference), the significant Figure of which is shown as FIG. 2 herein. ARD 24 includes at its free end an article pick-up head 38, which is used to retrieve articles 27 stored in bins 22 and deposit them into a dispensing chute 23. Once the article is deposited into dispensing chute 23, a user can operate an access door 25 located near the bottom of chute 23, so that the dispensed article can be retrieved.

In the environment of the invention, the articles can be stored in a storage area of the vending machine that keeps the articles in a cooled state, such as frozen (for ice cream novelties or frozen foods) or refrigerated (for drinks or fresh food), or the articles can just be kept at the ambient temperature (such as for snack food items or non-food items, such as video cassettes). In the illustrated embodiment housing 12 happens to includes a refrigeration unit 29 so that the stored articles can be kept cool, ARD 24 can be controlled to cause an insulated door 31 to swing open, so that the article 27 can be deposited into dispensing chute 23. Depending upon the space available within housing 12, ARD may have a normal resting position, i.e., a position it occupies between time periods when it is dispensing articles, that is located above article storage area 20, or alternatively, some other portion of the space within housing 12. Furthermore, although in the described embodiment the article storage bins are oriented vertically, in an alternative embodiment of the invention, other orientations could have been illustrated just as well, such as horizontal, or any angle therebetween. With an orientation for the stored articles which is different from that shown herein, the orientation and operation of the ARD 24 would have to be modified accordingly, a modification well within the ability of one of ordinary skill in this technology. Additionally, as noted above, when this invention is utilized in conjunction with a frozen or refrigerated storage area in the vending machine, such with a freezer as shown in U.S. Pat. No. 5,240,139, various kinds of thermal separating barriers can be used between the ARD 24 and the article storage compartments, such as a sheet having an arrangement of flexible fingers or flaps formed therein, such as shown in my PCT patent publication WO 03/073026 entitled Thermal Barrier For A Refrigerated Vending Machine.

As seen in greater detail in FIG. 2, in the illustrated embodiment, ARD 24 includes a carriage 26 which is mounted for sliding lateral movement along a first beam 28, for allowing carriage 26 to move, for example, in the front/back (X) direction over the article storage area 20. Furthermore, beam 28 is mounted for sliding lateral movement along a pair of beams 30*a* and 30*b*, for allowing beam 28 to move, for example, in the left/right (Y) direction over the article storage bins 22. Motors 32 and 34 are mounted in carriage 26 and beam 28, respectively, for controllably causing the aforesaid sliding lateral movements of carriage 26 and beam 28. A vacuum generator, comprising in the preferred embodiment a blower motor 36 provides suction to the article retrieving pickup head 38 via a suction hose 40 coupled between blower 36 and pickup head 38. Since hose 40 is connected between pickup head 38 which is repositioned by carriage 26 during article vending, and a blower motor 36 which is in a fixed position, a supply of hose 40 is needed, and is provided by constraining a supply loop 37 of the hose 40 in a narrow wall portion 39 at one side of housing 12. A narrow roller 41 which acts as a weight, is positioned so as to roll on top of supply loop 37, thereby keeping tension on hose 40 as it is extended and retracted from the supply loop 37.

With the above arrangement, carriage 26 can controllably position article retrieving pickup head 38 to a predetermined location, such as over a specific one of the article storage bins 22. The end of suction hose 40 which is connected to pickup head 38 is controllably driven in the up/down (Z) direction by, for example, a motor 42 which drives a set of pinch rollers (not specifically shown) mounted within carriage 26 and which engage hose 40, so as to control the up/down (Z) movement of pickup head 38. A vending machine control system 44 of conventional design develops control signals for controlling motors 32, 34 and 42, thereby moving carriage 26 along beam 28, moving beam 28 along beams 30 and driving the pinch rollers in carriage 26. The control signals from control system 44 also control activation of the vacuum generator so that suction is provided to pickup head 38 before or upon its contact with a solid object, which normally is the next article to be dispensed. Altogether, these components, which control the movement of pickup head 32 in the left/right (Y), front/back (X) and up/down (Z) directions, comprise the robotic article retrieving device 24. Of course, control system 44 also performs all the conventional control functions for proper operation of the vending machine.

It is noted that the invention described herein is applicable to other types of electronically controlled positioning means for the suction-type article retrieving device. For example, it may be desirable for the robotic positioning mechanism to include a rotary (R, θ) device of the type including an I beam of fixed length (or alternatively telescopic sections), for establishing an "R" movement for pickup head 38, and which pivots for establishing a "θ" movement. Alternatively, in other environments for the invention the robotic hose positioning mechanism may include an articulated arm or scissor system. As previously noted, the ARD 24 could me modified to operate so as to dispense articles stored in arrangements other than in vertical columns, and horizontal or other angles for article storage could be accommodated by suitable modification of ARD 24. Furthermore, ARD 24 could be used for positioning other types of pickup devices, such as a smaller diameter suction hose having a lower volume of air flow, but use a greater amount of suction or vacuum.

Even furthermore, although only a single storage area and article retrieving device are shown in the illustrated embodiments, the invention described herein could also be used in a dispensing apparatus/article handler of the type having multiple storage areas and/or robotic article handling mechanisms, such as two robotic mechanisms (both positioned vertically (i.e., one above the other) or horizontally (one in front of the other) or mixed, and one vertically and one horizontally) each one serving a different storage area (which storage area can store the articles to be dispensed in horizontal or vertical aligned stacks). Furthermore, when multiple article handling mechanisms are provided, each can be tailored for a particular operation. For example, one may have a relatively large diameter pickup head and use a high airflow/modest suction vacuum supply device (such as the illustrated blower motor 36), while the other may have a relatively small diameter pickup head and use a low airflow/high suction vacuum supply (such as a conventional vacuum pump).

With an article dispensing arrangement such as described herein, it is possible that if the controller in the vending machine does not keep track of the number of articles stored in each bin and how many have been vended from each bin, or does not have some way of accurately monitoring the height of the articles stored in the bin, or some other way to know when the last article in an article storage bin 22 has been dispensed, or even if it does, it is possible that here can be a malfunction in such mechanisms, and in such a case, it is possible that the article pick-up head 38 may go into an article storage bin from which the last article in that bin has already been dispensed. In that case, it is possible that the article pick-up head 38 may actually contact and then adhere to the bottom 70 of a bin 22. It would be desirable to provide modifications to the bottom of an article storage bin 22 so as to reduce/prevent the pick-up head in a suction-type article dispensing machine from adhering to the bottom of an article storage bin after the last article has been dispensed.

In this regard FIGS. 3A-3D illustrate a cross-section view of a portion of the article storage bin 22 of the vending machine, having modifications made in or incorporated with the bottom 70, in accordance with several alternative embodiments which incorporate the principles of the invention. More specifically, to prevent/reduce the tendency of the pick-up head in a suction-type article dispensing machine from adhering to the bottom of an article storage bin in the event the pick-up head inadvertently tries to retrieve another article after the last article has already been dispensed from the bin, an airflow path providing device is positioned or formed at the bottom of the article storage bin 22.

Figure 3D:
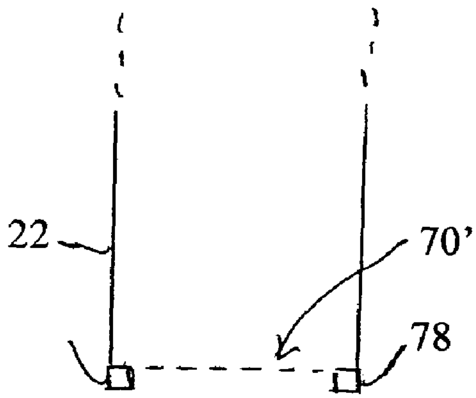
FIGS. 3A, 3B, 3C and 3D illustrate cross-sectional side views of the article storage bin of FIG. 1, having various modifications made thereto in accordance with the principles of the present invention.
Figure 3C:
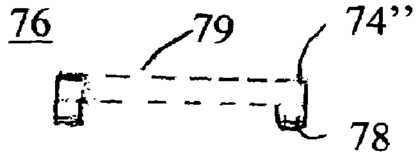
Figure 3B:
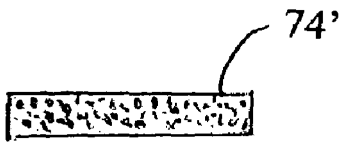
Figure 3A:
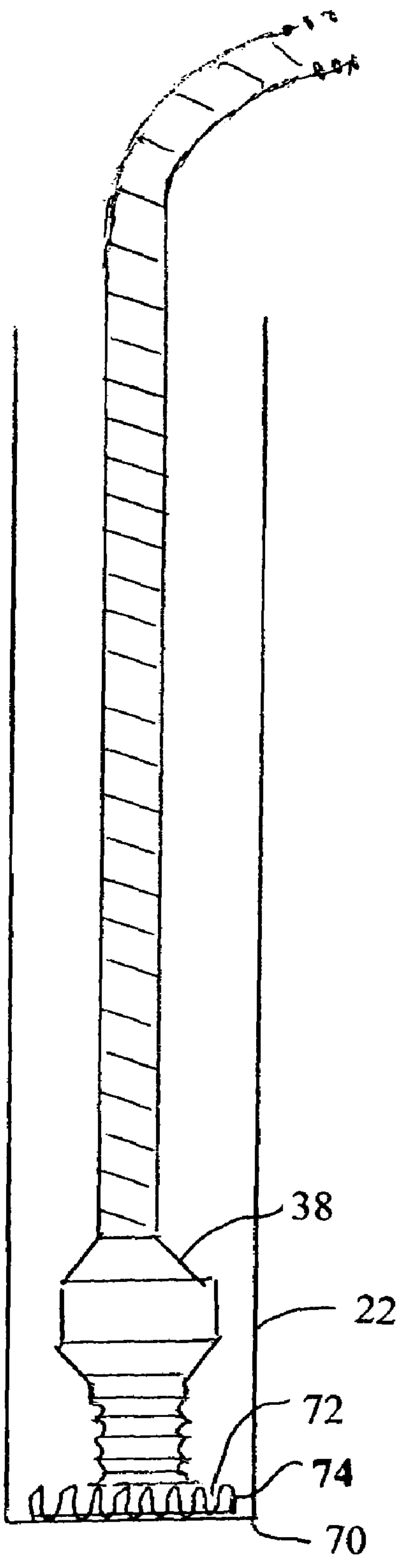

In FIG. 3A, the airflow path providing device comprises a piece of material 74, such as a mat, positioned at the bottom of a bin 22 that has on its upwardly facing surface at least one or more raised parallel channels 72, having a height sufficient to provide airflow paths which prevent pick-up head 38 from making a good suction contact to floor 70. In the illustrated embodiment, mat 74 simply comprises a piece of plastic corrugated material, cut so as to fit at the bottom of a bin 22. Mat 74 has a downwardly facing surface that is smooth, which helps ensure a flat positioning on the bottom of the bin, and also allows a good surface for application of glue or other means to affix the mat 74 to the bottom of the bin 22. However, a flat bottom for mat 74 is not required.

FIG. 3B illustrates another technique in accordance with the principles of the invention, wherein a mat 74' is comprised of an open-cell foam material, for example. The specific type of foam and the diameter of the open cells are picked in accordance with the amount of suction force that needs to be dissipated in order to prevent a good suction contact and then lifting of the bin 22 by the picker head 38 if it contacts the bottom 70 of the bin. That is, the open cells in the foam mat 74' provide the required amount of airflow passages. FIG. 3C illustrates another technique in accordance with the principles of the invention, wherein a mat 74" is comprised of a raised platform 76, having legs 78 for holding it above the floor 70, yet has holes in the space 79 between the legs. FIG. 3D illustrates another technique in accordance with the principles of the invention, wherein the bottom 70 of the bin 22 is modified so that the bottom 70' effectively provides the function of mat 74. In this case, bottom 70' has holes formed in it so as to prevent picker head 38 from becoming adhered thereto, and legs 78 are provided so as to slightly lift up the bin 22 so that the holes become more effective to dissipate the suction force in picker head 38. The holes 70' can be round or slot-shaped. In an alternative embodiment other ways to raise the bin floor are possible, and in fact such raising of the bin may not be needed in some applications and simply forming the holes 70' may be sufficient, for example if the bottom 70 of the bin is formed of several overlapping flaps of the material used to form the bin, only providing the holes 79 in the topmost flap of bin material may be sufficient.

While the present invention has been disclosed with reference to certain embodiments, numerous modifications, alterations and changes to the described embodiments are possible without departing from the sphere and scope of the present invention, as defined above, and in the following claims. Accordingly, it is intended that the present invention not be limited to the described embodiments, but that it has the full scope defined by the above language and the following claims, as well as equivalents thereof.

The invention claimed is:

1. An article storage container for use in an article handler which uses a suction-type gripping device, comprising:

a support structure for holding a plurality of article storage bins therein, with at least some of said plurality of bins being independently positionable with respect to others of said plurality of bins, so that said at least some of said plurality of bins can be removed from said support structure while said others of said plurality of bins remain with said support structure;

each independently positionable bin comprising wall portions coupled with one another and furthermore coupled with an article retaining end portion, for storing in a columnar manner, articles to be retrieved by the gripping device that enters a dispensing end of the bin which is opposite the article retaining end portion of the bin and can travel into said bin up to a point where it may contact said article retaining end portion, and an airflow path providing device at said article retaining end portion of the bin, which airflow path providing device includes structure that prevents the gripping device from developing enough suction force to grip to said article retaining end portion of the bin, irrespective of where said suction-type gripping device may contact said article retaining end portion of said bin.

2. The article storage container of claim 1, wherein said airflow path providing device includes contours therein which prevent the gripping device from developing enough suction force to grip to said article retaining end portion of the bin.

3. The article storage container of claim 1, wherein said airflow path providing device comprises an independently positioned piece of an air-porous material, positioned on top of the article retaining end portion of the bin.

4. The article storage container of claim 3, wherein said airflow path providing device comprises a mat formed of a foam material, positioned on top of the article retaining end portion of the bin.

5. The article storage container of claim 3, wherein said airflow path providing device comprises a material having a plurality of holes formed therein, positioned on top of the article retaining end portion of the bin.

6. The article storage container of claim 1, wherein said airflow path providing device is formed integrally with the article retaining end portion of the bin.

7. The article storage container of claim 6, wherein said airflow path providing device comprises a plurality of holes formed in the material which is used to construct the article retaining end portion of the bin.

8. An article dispensing apparatus, comprising:

a storage area for storing articles along a plurality of paraxially arranged columns, the storage area including a support structure for supporting a plurality of elongate article storage bins therewith for forming each said columns of articles, at least some of said plurality of bins being independently positionable with respect to others of said plurality of bins, so that said at least some of said plurality of bins can be removed from said support structure while said others of said plurality of bins remain with said support structure;

an article extracting device including a suction-gripping end for selectively gripping to an article stored inside the article storage bin and extracting the article from a dispensing end of the article storage bin; and a drive mechanism coupled to the article extracting device for moving the suction-gripping end into and then out of the dispensing end of the article storage bin and in a direction aligned with a longitudinal axis of the article storage bin, in order to extract a selected article from inside the article storage bin;

wherein said article storage bin comprises wall portions coupled with one another and furthermore coupled with an article retaining end portion which is located opposite the dispensing end of the article storage bin, and an airflow path providing device included at said article retaining end portion of the bin so as to be removable from said support structure when said article storage bin is removed from said support structure, which airflow path providing device includes structure that prevents the suction-gripping end from developing enough suction force to grip to said article retaining end portion of the bin, irrespective of where said suction gripping end may contact said article retaining end portion of said bin.

9. The article dispensing apparatus of claim 8, wherein said airflow path providing device includes contours therein which prevent the gripping device from developing enough suction force to grip to said article retaining end portion of the bin.

10. The article dispensing apparatus of claim 8, wherein said airflow path providing device comprises an independently positioned piece of an air-porous material, positioned on top of the article retaining end portion of the bin.

11. The article dispensing apparatus of claim 10, wherein said airflow path providing device comprises a mat formed of a foam material, positioned on top of the article retaining end portion of the bin.

12. The article dispensing apparatus of claim 10, wherein said airflow path providing device comprises a material having a plurality of holes formed therein, positioned on top of the article retaining end portion of the bin.

13. The article dispensing apparatus of claim 8, wherein said airflow path providing device is formed integrally with the article retaining end portion of the bin.

14. The article dispensing apparatus of claim 13, wherein said airflow path providing device comprises a plurality of holes formed in the material which is used to construct the article retaining end portion of the bin.

15. A method of preventing a suction type article gripping device in an article handler from gripping to the bottom of an article storage container, comprising the following steps:

providing a support structure for holding a plurality article storage containers therein, with at least some of said plurality of containers being independently positionable with respect to others of said plurality of containers, so that said at least some of said plurality of containers can be removed from said support structure while said others of said plurality of containers remain with said support structure;

providing as each of said article storage containers a bin comprising wall portions and an article retaining end portion, for storing in an a columnar manner, articles to be retrieved by the gripping device, the gripping device entering a dispensing end of the bin which is opposite the article retaining end portion of the bin, and providing an airflow path device at said article retaining end portion of the bin, which airflow path providing device prevents the gripping device from developing enough suction force to grip to any portion of said article retaining end portion of the bin.

16. The method of claim 15, wherein said step of providing an airflow path device, comprises providing said device integrally with the material used to construct the bottom of the bin.

17. The method of claim 15, wherein said step of providing an airflow path device, comprises providing said device independently of the bin, and then positioning said device so it is securely attached to the bottom of the bin.

18. An article storage device for use in an article retrieving apparatus, which apparatus uses a suction-type gripping device that enters a dispensing end of the article storage device to retrieve articles stored in the article storage device, the article storage device, comprising:

a support structure including a plurality of article supporting surfaces therein for holding a plurality of paraxially aligned columns of stored articles thereon, with at least some of said plurality of article supporting surfaces being independently positionable with respect to others of said plurality of article supporting, surfaces, so that said at least some of said plurality of article supporting surfaces can be removed from said support structure while said others of said plurality of article supporting surfaces remain with said support structure;

each article supporting surface being located opposite a dispensing end of the article storage device for supporting at least some of the weight of at least one article to be retrieved by the suction-type gripping device which can travel into said article storage device up to a point where it may contact said article supporting surface;

wherein said article supporting surface of the article storage device includes therewith airflow path providing structure, which said airflow path providing structure prevents the suction-type gripping device from developing enough suction force to grip to said article supporting surface of the article storage device, irrespective of where said suction-type gripping device may contact said article supporting surface.

19. An article storage container for use in an article storage area of an article handler, which article handler uses a suction-type gripping device for retrieving articles from the article storage container when the article storage container is positioned in the article storage area of the article handler, the article storage container comprising:

a support structure for holding a plurality article storage bins therein, with at least some of said plurality of bins being independently positionable with respect to others of said plurality of bins, so that said at least some said plurality of bins can be removed for said support structure while said others of said plurality of bins remain with said support structure;

each independently positionable bin having its own wall portions joined with its own article retaining end portion, for storing in a columnar manner, articles to be retrieved by the gripping device that enters a dispensing end of the bin which is opposite the article retaining end portion of the bin, and an airflow path providing device at said article retaining end portion of the bin, which airflow path providing device includes structure that prevents the gripping device from developing enough suction force to grip to said article retaining end portion of the bin.

20. The article storage container of claim 19, wherein said airflow path providing device includes contours therein which prevent the gripping device from developing enough suction force to grip to said article retaining end portion of the bin.

21. The article storage container of claim 19, wherein said airflow path providing device comprises an independently positioned piece of an air-porous material, positioned on top of the article retaining end portion of the bin.

22. The article storage container of claim 21, wherein said airflow path providing device comprises a mat formed of a foam material, positioned on top of the article retaining end portion of the bin.

23. The article storage container of claim 19, wherein said airflow path providing device is formed integrally with the article retaining end portion of the bin.

24. The article storage container of claim 23, wherein said airflow path providing device comprises a plurality of holes formed in the material which is used to construct the article retaining end portion of the bin.

25. An article dispensing apparatus, comprising:

a storage area for storing articles along a plurality of longitudinal axes;

a plurality of elongate article storage bins which contain said articles along said plurality of longitudinal axes in the storage area;

a support structure for supporting a plurality of said article storage bins therewith, at least some of said plurality of article storage bins being independently positionable with respect to others of said plurality of article storage bins, so that said at least some of said plurality of article storage bins can be removed from said support structure while said others of said plurality of article storage bins remain with said support structure;

an article extracting device including a suction-gripping end for selectively gripping to an article stored inside the article storage bin and extracting the article from a dispensing end of the article storage bin; and a drive mechanism coupled to the article extracting device for moving the suction-gripping end into and then out of the dispensing end of the article storage bin and in a direction aligned with the longitudinal axis in the article storage bin, in order to extract a selected article from inside the article storage bin;

wherein said article storage bin comprises wall portions and an article retaining end portion which is located opposite the dispensing end of the article storage bin, and an airflow path providing device included at said article retaining end portion of the bin, which airflow path providing device includes structure that prevents the gripping device from developing enough suction force to grip to said article retaining end portion of the bin.

26. The article dispensing apparatus of claim 25, wherein said airflow path providing device comprises an independently positioned piece of an air-porous material, positioned on top of the article retaining end portion of the bin.

27. The article dispensing apparatus of claim 26, wherein said airflow path providing device comprises a mat formed of a foam material, positioned on top of the article retaining end portion of the bin.

28. The article dispensing apparatus of claim 25, wherein said airflow path providing device is formed integrally with the article retaining end portion of the bin.

29. The article dispensing apparatus of claim 28, wherein said airflow path providing device comprises a plurality of holes formed in the material which is used to construct the article retaining end portion of the bin.

30. A method of preventing a suction type article gripping device in an article handler from gripping to the bottom of an article storage container which is independently positionable into and out of an article storage area of the article handler, comprising the following steps:

providing a support structure for holding a plurality article storage containers therein, with at least some of said plurality of containers being independently positionable with respect to others of said plurality of containers, so that said at least some of said plurality of containers can be removed from said support structure while said others of said plurality of containers remain with said support structure;

providing as each of said independently positionable article storage containers a plurality of wall portions joined with an article retaining end portion, for storing in a columnar manner, articles to be retrieved by the gripping device, the gripping device entering a dispensing end of the bin which is opposite the article retaining end portion of the bin, and providing an airflow path device at said article retaining end portion of the bin, which airflow path providing device prevents the gripping device from developing enough suction force to grip to said article retaining end portion of the bin.

31. The method of claim 30, wherein said step of providing an airflow path device, comprises providing said device integrally with the material used to construct the bottom of the bin.

32. The method of claim 30, wherein said step of providing an airflow path device, comprises providing said device independently of the bin, and then positioning said device so it is securely attached to the bottom of the bin.

33. The article storage container of claim 1, wherein said wall portions and said article retaining end portion of each bin are formed integrally with each said bin.

34. The article storage device of claim 18, wherein said support structure holds said plurality of article supporting surfaces in a substantially horizontal orientation.

35. The article storage device of claim 18, wherein said support structure holds said plurality of article supporting surfaces in a non-vertical orientation.

36. The article storage device of claim 18, wherein said airflow path providing device includes contours therein which prevent the gripping device from developing enough suction force to grip to said article supporting surface.

37. The article storage device of claim 18, wherein said airflow path providing device comprises an independently positioned piece of an air-porous material, positioned on top of the article supporting surface.

38. The article storage device of claim 37, wherein said airflow path providing device comprises a mat formed of a foam material, positioned on top of the article supporting surface.

39. The article storage device of claim 18, wherein said airflow path providing device is formed integrally with the article supporting surface.

40. The article storage device of claim 39, wherein said airflow path providing device comprises a plurality of holes formed in the material which is used to construct the article supporting surface.

* * * * *